May 16, 1950            E. F. G. GARNIER            2,507,567
MECHANICAL COMPUTER FOR DETERMINING THE POSITION
OF A MOVING BODY RELATIVELY TO A TWO-COORDINATE
REFERENCE SYSTEM
Filed June 16, 1948            4 Sheets-Sheet 1
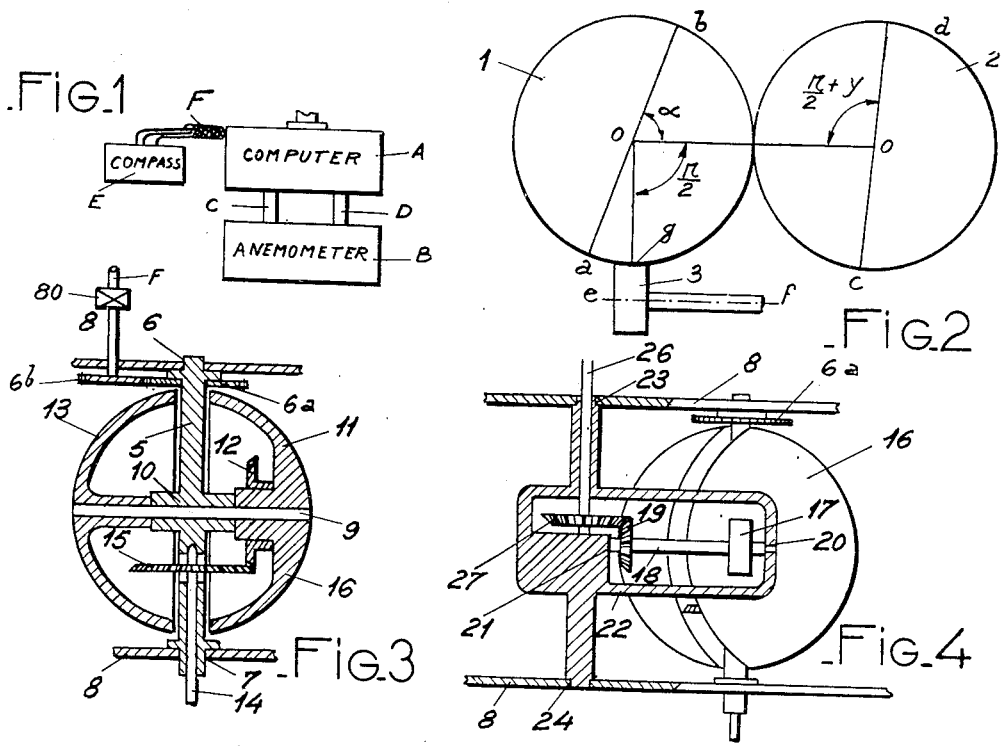
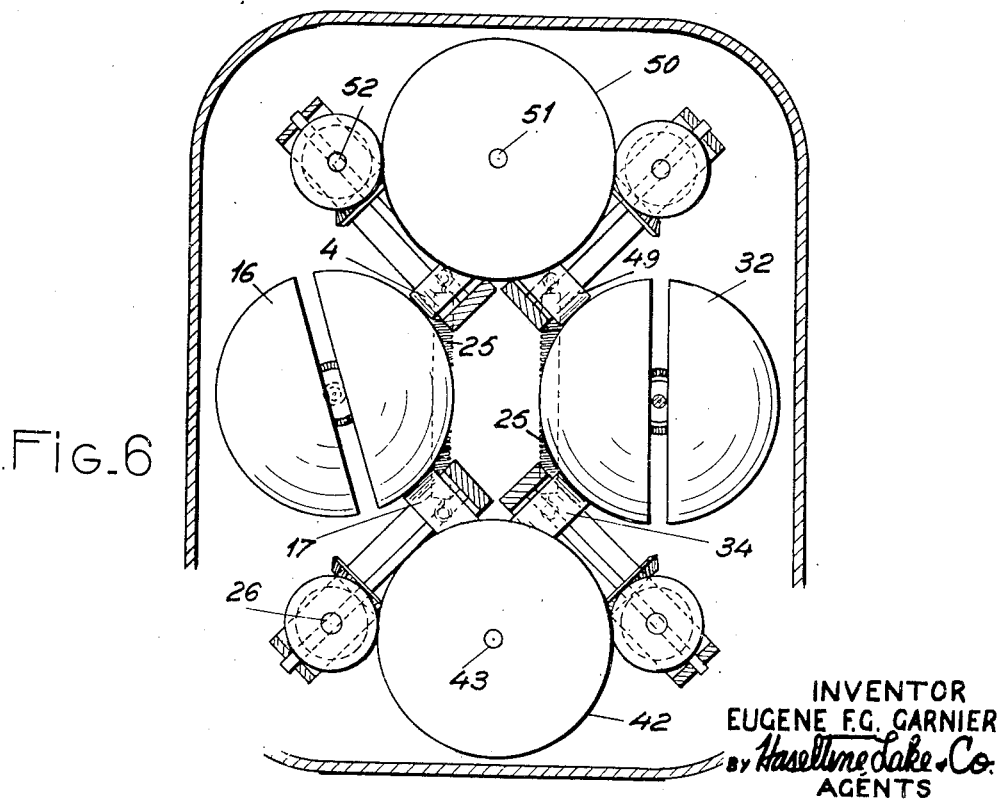
INVENTOR
EUGENE F.G. GARNIER
BY Haseltine Lake & Co.
AGENTS May 16, 1950 E. F. G. GARNIER 2,507,567
MECHANICAL COMPUTER FOR DETERMINING THE POSITION
OF A MOVING BODY RELATIVELY TO A TWO-COORDINATE
REFERENCE SYSTEM
Filed June 16, 1948 4 Sheets-Sheet 2
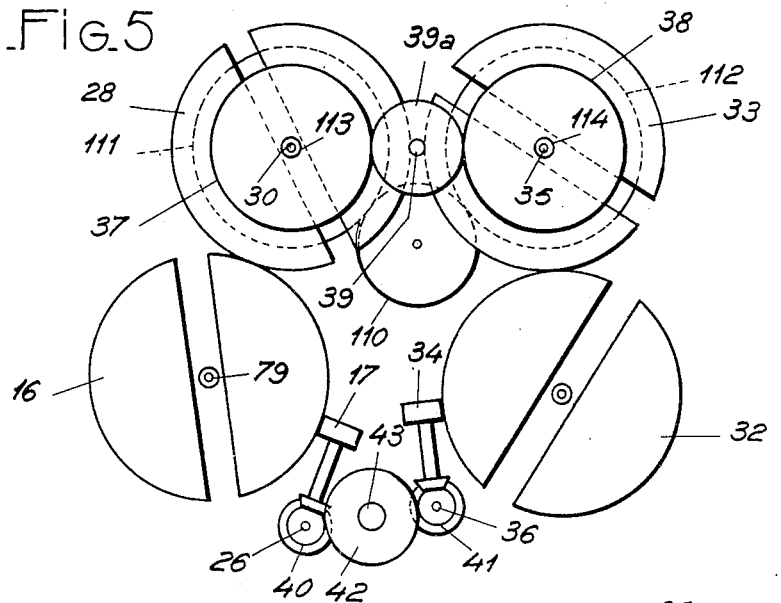
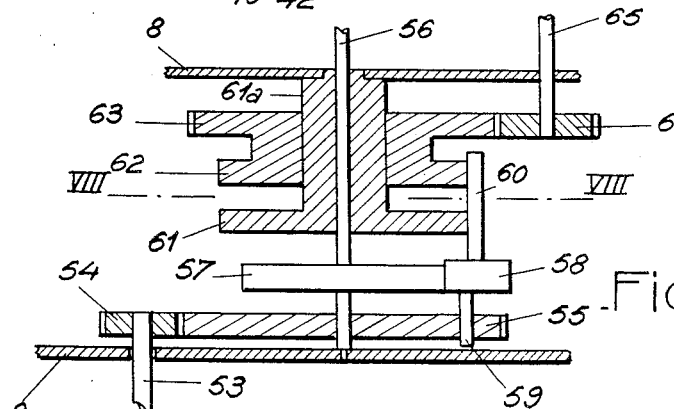
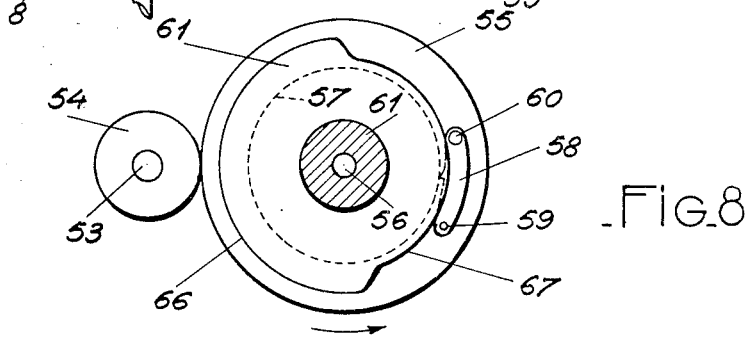
INVENTOR
EUGENE F.G. GARNIER
By Haseltine, Lake & Co.
AGENTS

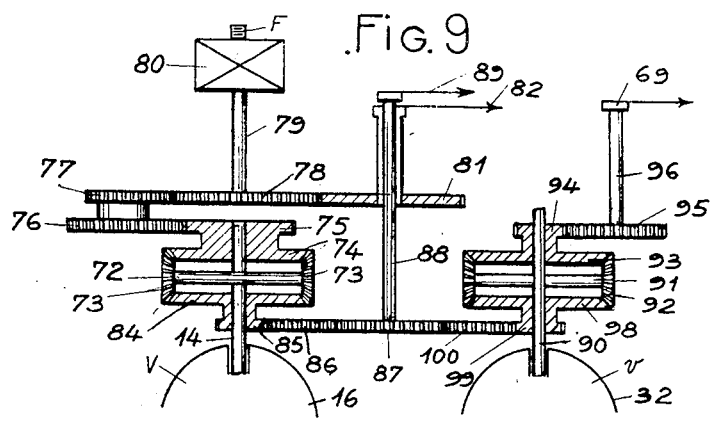

May 16, 1950 E. F. G. GARNIER 2,507,567
MECHANICAL COMPUTER FOR DETERMINING THE POSITION
OF A MOVING BODY RELATIVELY TO A TWO-COORDINATE
REFERENCE SYSTEM
Filed June 16, 1948 4 Sheets-Sheet 4
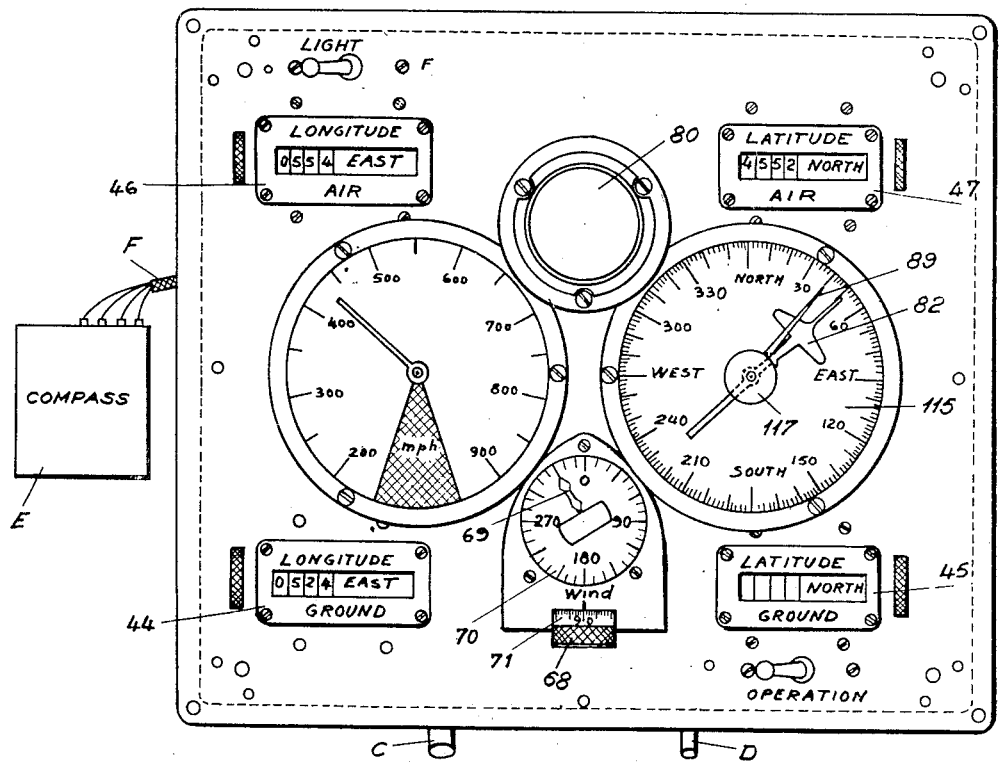
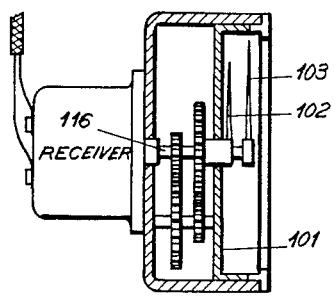
INVENTOR
EUGENE F. G. GARNIER
By Hazeltine Lake & Co.
AGENTS Patented May 16, 1950

2,507,567

UNITED STATES PATENT OFFICE 2,507,567

MECHANICAL COMPUTER FOR DETERMINING THE POSITION OF A MOVING BODY RELATIVELY TO A TWO-COORDINATE REFERENCE SYSTEM

Eugène François Gilbert Garnier, Nice, France

Application June 16, 1948, Serial No. 33,264

12 Claims. (Cl. 235—61)

This invention relates to a mechanical computer adapted to calculate the position of a moving body relatively to a two-coordinate reference system, such as that used in maritime or air navigation in determining the position of a ship or an aircraft with respect to a system of geographic coordinates or a system of planar rectangular coordinates.

While for the sake of clarity in the ensuing description of the invention it will be assumed that the moving body the position of which is to be determined is an aeroplane, it will be understood however that the invention is equally applicable to any other vehicle or moving body such as a ship, for example.

The data or elements available on board an aeroplane for determining its position at the time $t_1$ are as follows:

$V=$ Air speed of the aeroplane.
$v=$ The wind velocity.
$\alpha=$ The angle formed by the axis of the aeroplane with a selected one of the reference axes.
$\beta=$ The angle formed by the direction of wind with the same reference axis.
$t=t_1-t_0=$ the interval of time elapsed from the starting time $t_0$ or the time of passing over a checked landmark which, in particular, may coincide with the last position of the aircraft to have been checked.

The engineering problem which the invention aims to solve consists of providing a mechanism adapted from the above-defined data automatically to derive the coordinates of a point reached by the aircraft, i. e. automatically to provide the following formulae expressed as functions of the particular coordinate system used:

*First instance.*—If the coordinates used are the geographic coordinates expressed as the longitude X and latitude Y, the angles $\alpha$ and $\beta$ being measured with respect to north, the coordinates $X_1$ and $Y_1$ of the aeroplane at the time $t_1$ are determined with respect to its coordinates $X_0$ and $Y_0$ at the initial time $t_0$ by the following equations:

(1) $$X_1-X_0=\int_{t_0}^{t_1}\frac{V\sin\alpha}{\cos Y}dt+\int_{t_0}^{t_1}\frac{v\sin\beta}{\cos Y}dt$$

$$Y_1-Y_0=\int_{t_0}^{t_1}V\cos\alpha\,dt+\int_{t_0}^{t_1}v\cos\beta\,dt$$

*Second instance.*—If the coordinates used are planar rectangular coordinates the foregoing formulae are reduced to the following expressions wherein the angles $\alpha$ and $\beta$ may be measured with respect to any selected direction:

(2) $$X_1-X_0=\int_{t_0}^{t_1}V\sin\alpha\,dt+\int_{t_0}^{t_1}v\sin\beta\,dt$$

$$Y_1-Y_0=\int_{t_0}^{t_1}V\cos\alpha\,dt+\int_{t_1}^{t_0}v\cos\beta\,dt$$

The main object of the invention is to provide a computer adapted to first execute the operations corresponding to each of the first and second terms of the second members of the above equations, then add the results found for the terms of each of said second members.

Another object of the invention is to provide, in a computer of the character described adapted for use in navigation with geographic coordinates, a pair of tangent spheres for the calculation of the expressions $$\frac{V\sin\alpha}{\cos Y}\text{ and }\frac{v\sin\beta}{\cos Y}$$

one of which spheres, driving sphere, is rotated at a speed proportional to V or v around a diametric axis forming an angle $\alpha$ or $\beta$ with the center line of the spheres, said driving sphere being adapted to drive in rotation the other or driven sphere around a diametric axis contained in a common diametric plane with the axis of rotation of the driving sphere and forming an angle $$\frac{\pi}{2}+Y$$

with said centerline, a roller tangentially engaging said driving sphere and rotatable around an axis parallel to said centerline of the spheres and contained in said common diametric plane, means for varying, in each of said common diametric planes, the angular orientation of the axes of the related spheres, and means for totalizing the movements of both said driven spheres, on the one hand, and the movements of both said rollers, on the other hand.

Another object of the invention is to provide, in a computer of the character described adapted for use in navigation with planar rectangular coordinates, a driving sphere for each group of values V, $\alpha$, and $v$, $\beta$, rotated at a speed proportional to V or $v$ around a diametric axis and adapted to drive in rotation a pair of tangent rollers rotatable around mutually perpendicular axes contained in a common plane with the axis of rotation of the sphere, one of said roller axes defining an angle $\alpha$ or $\beta$ with said diametric axis, means for varying in each of said common planes the angular orientation of the related sphere axis and means for totalizing, on one hand, the movements of both said rollers, the axes of which form angles α and β with the diametric axes of said spheres, and the movements of said other two rollers, on the other hand.

Another object of the invention is to provide in such a computer a rotary member rotated at constant speed and means for multiplying said speed by a factor proportional to the wind velocity.

A further object of the invention is to provide, in such a computer adapted for use in navigation with planar rectangular coordinates, for the introduction, into the angular orientation of said spheres with respect to the selected reference axis, of any desired angle of positive or negative magnitude. It has been stated hereabove that where the coordinate system used is a system of rectangular planar coordinates, the directions of the coordinate axes may be arbitrarily selected. Consequently it will be particularly desirable to select for one of said coordinate axes the track which is to be followed by the aircraft, and this requires the computer to be organized in such a way as to make it easy to effect a quick change in direction of said axis through the selective addition, to the orientation angles α or β of the driving spheres, of any desired angle ω positive or negative in value.

Assume by way of example that the reference axis selected is geographic north, the course of the aeroplane being α and the direction of wind β, and assume that the supports of both driving spheres are simultaneously angularly displaced a common angle ω, the component velocities entering in the formulae (2) respectively assume the values $V \sin(\alpha-\omega)$, $V \cos(\alpha-\omega)$, $v \sin(\beta-\omega)$ and $v \cos(\beta-\omega)$, this being the same as saying that the reference axes have pivoted through an angle ω towards right or left, depending on whether said angle is positive or negative in value.

Said introduction of the angle ω is preferably accomplished through meshing gears making it possible to totalize the indications provided by the sphere orienting devices with the track angle indication, said gears for instance comprising epicyclic gear trains of a type similar to differential gears.

Thus the mechanical computer according to the invention makes it possible to select as the coordinate axes the track of the aircraft itself and a normal thereto, one of the counter devices being then adapted to indicate the distance covered and the other counter indicating the off-track deviation.

Said latter counter has operatively connected therewith a repeater device arranged within sight of the pilot and adapted to enable him to ascertain at any time whether the plane is heading on its proper track (the repeater indication then being 0) or the amount and direction of the off-track deviation if any.

The ensuing description made in reference with the accompanying drawings given by way of illustration and not of limitation will provide a clear understanding of the features of my invention and the operation of the devices constructed according to it. In the drawings:

Fig. 1 is a diagrammatic showing of the computer forming the subject of this invention together with the elements of the aircraft with which it is associated.

Fig. 2 diagrammatically illustrates the device used for integrating the first or the second members of the navigational equations in geographical coordinates according to the invention.

Fig. 3 shows in diametric cross-section a driving or driven sphere with associated parts.

Fig. 4 shows in cross-section a roller with its associated driving parts.

Fig. 5 diagrammatically shows the manner in which the spheres and rollers are arranged and correlated to form the computer as used in navigation with geographical coordinates.

Fig. 6 is a similar diagrammatic showing of the arrangement and correlation of the spheres and rollers to form a computer usable in navigation with rectangular planar coordinates.

Fig. 7 is a diagrammatic showing of a speed variator usable to introduce the wind velocity into the operation of the computer.

Fig. 8 is a section of the Figure 7 substantially on line VIII—VIII.

Fig. 9 is a diagrammatic showing of a computer according to the invention provided with means for introducing the track angle indication thereinto.

Fig. 10 diagrammatically shows the means for controlling the off-track deviation repeater.

Fig. 11 diagrammatically shows the dial of the off-track deviation repeater.

Fig. 12 shows the general dial of a computer constructed according to the invention.

Fig. 13 is a diagram showing a track laid out on a chart.

Fig. 14 is a diagram similar to Fig. 13 showing an angular track laid out on a chart.

Fig. 15 shows a change in track as mapped out on a chart.

Fig. 16 shows the manner in which an unexpected change of track is mapped out on the chart.

Fig. 17 illustrates a coordinate correcting diagram effected as a result of a direct check on the position of the aeroplane.

Fig. 1 diagrammatically shows a computer A associated with an anemometer B from which project two shafts C and D, the shaft C being rotated as a function of the air speed V of the aeroplane and the shaft D being rotated at a constant speed $v_0$ as a result of the use within the anemometer B of any suitable known means, such as the anchor regulator of a crutch governor. The computer A is moreover associated with a compass E driving a remote control system F of any suitable type the transmitter end of which forms a part of the compass. The shafts C and D extend into the body of the computer and their functions will be described later. The remote control connection F also extends into the computer to actuate a receiver therein, the function of which will also be described hereinafter, by means of a relay driven off the shaft C.

As diagrammatically indicated in Fig. 2 the integrator adapted to yield the values of the first terms in the second members of the equations (1), comprises a first sphere 1 driven in rotation at a speed proportional to V around its diameter $ab$ contained in the plane of the drawing. The sphere 1 drives in rotation a second sphere 2 tangent thereto and rotatable around its diameter $cd$ also in the plane of the drawing. The sphere 1 is moreover arranged to drive a roller 3 tangent thereto, the axis of rotation $ef$ of said roller and the point of contact $g$ of the roller 3 with the sphere 1 being contained in the plane of the drawing in such a way that the angle $gOO'$ is a right angle.

The spheres 1 and 2 are mounted on supports respectively rotatable about axes normal to the plane of the drawing and extending through the centers of the related spheres, so that the axes of rotation $ab$ and $cd$ of said spheres are adapted to have any desired angular orientations imparted to them with respect to the center-line $OO'$.

Under such conditions, assuming said axes $ab$ and $cd$ oriented in such a way that $O'Ob = \alpha$ and $$OO'd = \frac{\pi}{2} + Y$$

it may readily be seen that:

(a) The sphere 2 is driven around its axis $cd$ at a speed proportional to $$\frac{V \sin \alpha}{\cos Y}$$

(b) The roller 3 is rotated about its axis $ef$ at a speed proportional to $V \cos \alpha$.

It will be understood that in such a device wherein the driving sphere would be driven in rotation in response to $v$ and would be oriented as a function of $\beta$, with the driven sphere continuously oriented as a function of $Y$, there would be obtained the component velocities $$\frac{v \sin \beta}{\cos Y}$$

and $v \cos \beta$ of the wind.

The mechanical computer according to the invention essentially comprises two devices such as that just described. The movements of both driven spheres are combined or totalized and the movements of both rollers are likewise totalized and the resulting corresponding movements are transmitted to counters specially arranged to count in degrees and minutes. Assuming that initially said counters indicate the coordinates of the take-off point, they will continue to constantly indicate the coordinates of the current instantaneous position of the aeroplane.

If in the device just described the sphere 2 is replaced by a roller 4 similar to the roller 3, as shown in Fig. 5, the axis of rotation of said roller 4 being normal to the axis of rotation of the roller 3 it will at once be seen that the resulting movements obtained will be those defined by the equations (2). The counters actuated by the set of two devices each comprising two rollers will then indicate the position of the aeroplane with respect to rectangular planar coordinates.

In the device diagrammatically shown in Fig. 2, if the rotary support on which rests the axis of the sphere projects at any point from out of said sphere, it is obvious that it will be impossible to impart to the sphere all of the conceivable angular orientations about the axis of said support. For that reason the driving and/or driven spheres are, according to the invention, organized in the manner shown in Fig. 3. A support or spindle 5 is journaled in bearings 6 at both ends thereof supported in the casing 8. Said supporting spindle 5 mounts a gear 6a meshing with a gear 6b controlled from the receiver 1a of the remote control system F of the compass E. A spindle 9 normal to the axis of rotation of the supporting spindle 5 extends through said supporting spindle and is freely rotatable in a bearing 10 formed in the spindle 5. A portion of a sphere 11 centered on the point of intersection of the axis of the spindle 9 with the axis of rotation of the support 5 is secured on the spindle 9 and mounts a bevel-gear 12. Another portion of a sphere 13 concentric with the portion 11 is also secured on the spindle 9. Through the bearing 7 there extends a shaft 14 driven in rotation as a function of or in response to V through a connection with the shaft C, or as a function of $v$ as will be described hereinafter, the spindle 14 being coaxial with the axis of rotation of the supporting spindle 5. The spindle 14 carries a bevel-gear 15 meshing with the bevel-gear 12. The gap between both the sphere portions 11 and 13 may be provided small enough for practically considering the assembly thus formed as constituting a complete sphere 16.

The driven sphere is constructed in a similar manner, the respectively corresponding members therein however perform reversed functions; thus it is the sphere which upon being rotated imparts movement to the shaft corresponding with the shaft 14 by means of gears corresponding with the gears 12 and 15.

As shown in Fig. 4 the roller 17 is mounted on a shaft 18 provided with a gear 19.

The shaft 18 is journaled in bearings 20 and 21 supported in a frame 22 pivoted as at 23 and 24 in the casing 8 of the device. The roller 17 is moreover maintained in resilient engagement with the surface of the related sphere 16 by a spring 25 as shown in Fig. 6. An output shaft 26 provided with a gear 27 in mesh with the gear 19 extends through the bearing 23 coaxially with the center axis of the bearings 23 and 24 of the frame and transmits movement of the roller as derived from the movement of the driving sphere 16.

In the instance where geographical coordinates are used, the mutual arrangement of the spheres and rollers comprising the computer is provided as shown in Fig. 5. The driving sphere 16 rotated as a function of V drives the driven sphere 28 and the roller 17. As previously indicated the shaft 30 projecting from the driven sphere 28 is rotated as a function of $$\frac{V \sin \alpha}{\cos Y}$$

while the shaft 26 projecting from the roller 17 is rotated as a function of $v \cos \alpha$. In a similar manner the driving sphere 32 rotating as a function of $v$ drives the driven sphere 33 and the roller 34, the shafts 35 and 36 of which are respectively rotated as functions of $$\frac{v \sin \beta}{\cos Y}$$

and $v \cos \beta$. The shaft 30 of the driven sphere 28 has secured thereon a gear 37; also the shaft 35 of the driven sphere 33 has secured thereon a gear 38. A differential gear train 39a has one of its sun-gears meshingly engaged by the gear 37 and its other sun-gear engaged by the gear 38, whereby the shaft 39 mounting the armature of said differential is driven at a speed proportional to $$\frac{V \sin \alpha}{\cos Y} + \frac{v \sin \beta}{\cos Y}$$

In a similar way the shafts 26 and 36 mount gears 40 and 41 which respectively meshingly engage the related sun-gears of a differential 42, whereby the shaft 43 of the central armature of this differential 42 is rotated at a speed proportional to $V \cos \alpha + v \cos \beta$.

The shafts 39 and 43 respectively actuate the longitude and latitude counters such as those shown at 44 and 45 in Fig. 12, adapted to indicate the position of the aeroplane with respect to ground.

The shafts 30 and 26 which are respectively rotated at speeds that are functions of $$\frac{V \sin \alpha}{\cos Y}$$

and $V \cos \alpha$ actuate two counters such as those illustrated at 46 and 47 in Fig. 12, and are adapted to indicate the longitude and latitude of the position with respect to air.

Fig. 6 shows the relative arrangements of the spheres and rollers forming a computer usable in navigation with planar rectangular coordinates. The driving spheres 16 and 32 respectively drive the pairs of rollers 17—4 and 34—49; the rollers 4 and 49 are operatively associated with a differential 50 the shaft 51 of which is rotated at a speed proportional to $V \sin \alpha + v \sin \beta$ while the rollers 17 and 34 are associated with the differential 42 the shaft 43 of which will be rotated at a speed proportional to $V \cos \alpha + v \cos \beta$. The shafts 51 and 43 respectively actuate the longitude and latitude counters which indicate the position of the aircraft with respect to the ground. The shafts 52 and 26 which are respectively rotated as functions of $V \sin \alpha$ and $V \cos \alpha$ actuate two counters indicating the longitude and latitude of the point with respect to air. The frames 22 corresponding with a common sphere are interconnected through a spring 25 which thus causes the rollers to resiliently engage the sphere.

For the introduction of the various parameters $V$, $\alpha$, $v$, $\beta$ and $Y$ into the computer, various devices are used now to be described.

The air-speed of the aeroplane, $V$ is supplied by a separate device operating similarly to an anemometer. The value thereof may be transmitted to the sphere 16 through any suitable mechanical transmission. Alternatively the rotation of the sphere could be placed under the control of that of the anemometer which may for instance be so constructed as to emit electric pulses at a rate of frequency proportional to the air speed of the aeroplane. Such means used for the introduction of the speed V into the operation of the computer is immaterial with the present invention.

Regardless of what may be the initial direction from which is measured the angle $\alpha$ formed by the axis of the aeroplane, the angular orientation of the support for the sphere 16 results from a controlling connection thereof with the dial of a gyroscopic compass E for instance installed elsewhere in the plane. Such connection is accomplished through the remote control system F and the receiver 1a.

As concerns the wind velocity $v$ it may be indicated by the Meteorological Service or reckoned by any means available on board the plane and is introduced into the computer by the navigator. Said anemometer B as stated above, is adapted in addition to and independently of the speed proportional to V, to supply a constant speed of suitably selected value $v_0$ which is transmitted by it to the computer.

The role of the navigator consists of so setting the controls of a speed variator interposed in the power transmission leading to the drive sphere 32 as to cause said constant speed $v_0$ to be multiplied by a factor proportional to the wind velocity $v$. One construction of such a variator is diagrammatically illustrated in Figs. 7 and 8. The shaft 53 driven at the constant speed $v_0$ through any suitable means which is immaterial with the present invention, carries a gear 54 meshing with a gear 55 loosely mounted on the shaft 56 which is a driven shaft and should rotate at a speed proportional to $v$. Said shaft 56 carries a disk 57 having a finely knurled or serrated periphery against which the pointed tip of a pawl 58 is urged into engagement therewith by a spring means not shown. The pawl 58 is pivoted about a pin 59 rotatable with the gear 55 and said pawl carries at its end a projecting pin 60. The device further includes two cams 61 and 62 coaxial with the shaft 56, the cam 61 being fixed on the casing 8 of the apparatus while the shaft 62 is rotatable about the shaft 56, said cam engaging an intermediate hub portion 61a of the fixed cam 61.

The cam 62 is moreover rigid with a gear 63 meshing with a gear 64 mounted on a shaft 65. The contours of each of the cams 61 and 62 is comprised of two arcuate sections, a section 66 of larger radius substantially extending over half a circumference while the other section 67 has a smaller radius than the section 66. Under the action of the spring loading the pawl 58 the pin 60 is pressed against the periphery of the cams 61 and 62. The shaft 65 is provided at its top with an operating button 68 adapted to displace in rotation a wind velocity scale graduation 70 as shown in Fig. 12. Rotation of the knob 68 is moreover adapted through the shaft 65 and pinion 64 (Fig. 7) to rotate the adjusting cam 62, the angular setting of which makes it possible to compensate for the wind velocity.

It will be seen that as the high portions 66 of the cams 61 and 62 are in opposed relationship the pawl 58 remains continuously in raised condition and its shaft 56 is therefore not driven in rotation. This position of the cams corresponds with the speed $v=0$. When however the high sections 66 of the cams 61 and 62 are in coincident or registering relationship with each other, each revolution effected by the pawl 58 at the speed $v_0$ causes the shaft 56 to revolve 180°, since said pawl is operative to drive the disk 57 each time the pin 60 engages the lower cam-sections 67 of said cams. This is the position corresponding with the maximum wind velocity. Any intermediate speed value may be obtained by varying the position of the movable cam 62 by means of the gears 63 and 64 as actuated by the pilot through the operating knob 68, that is by imparting to the lower sections 67 of said cams in coincidence with each other an angular extent included between 0 and 180°.

The wind angle $\beta$ with respect to the selected reference axis is reckoned by any means available, and the navigator through acting on an appropriate control will impart a suitable orientation to the support of the drive sphere 32 which is rotated as a function of $v$, the navigator for that purpose having reference to an angular scale which repeats said orientation such as the one shown at 70 in Fig. 12. This device will be described at greater length hereinafter.

It will be recalled as stated above that one of the counters of the computer, say the counter 45 constantly registers the latitude of the current instantaneous position. In order to orientate the driven spheres in the event of a computer adapted for navigation in geographical coordinates as a function of the latitude, the supports of said spheres are mechanically connected with the control for said counter 45 and are thus adapted to be oriented as a function of the latitude Y.

The shaft 43 (Fig. 5) rotated in response to the latitude controls the shaft of the counter 45 (Fig. 12) through a bevel-gearing not shown. It moreover controls a gear 110 (Fig. 5) which simultaneously engages the gears 111 and 112 rotatable with the supports 113 and 114 of the driven spheres 28 and 33 and consequently is effective to orientate said supports as a function of the latitude. The operative transmission from the shaft 43 to the gear 110 (not shown for greater simplicity), includes worm and worm-gears. The drive ratio therethrough is such that the supports 113 and 114 effect a complete revolution for every 3600 revolutions of the shaft of the counter 45.

As previously explained herein, it is both practicable and desirable, in the event that reference system used to define the position of the aeroplane comprises planar rectangular coordinates, to select as one of the coordinate axes the actual track or course which the plane is to keep. In such case it is necessary that the orientation of the supports of the driving spheres 16 and 32 be at all times maintained at values which not only are functions of the angles $\alpha$ and $\beta$ but also functions of the track angle $\omega$.

For that purpose the mechanical connecting means which provide for the orientation of said driving spheres in response to $\alpha$ or $\beta$ as the case may be, each comprises a gearing such as an epycyclic gear-train for instance, which makes it possible selectively to add any desired angle $\omega$ positive or negative in value to the angles $\alpha$ or $\beta$. Such a device is diagrammatically illustrated in Fig. 9.

The spindle 14 of the sphere 16 rotated as a function of V is rigid with the planetary-carrier cage 72 of a differential having planetaries 73. The planetaries 73 mesh with a sun-gear 74 rigid in rotation with a gear 75 which in turn meshes with a gear 76. The gears 75 and 76 are equal in pitch diameter.

The gear 76 is rigid in rotation with the gear 77 which meshes with the gear 78 fast on the shaft 79 controlled from the compass actuated relay 80.

The drive ratio through the gear-train comprising the gears 75, 76, 77, 78 is $-2$.

The gear 78 is in mesh with a gear 81 rotatable with an indicating needle 82 adapted to indicate or repeat in cooperation with a suitable dial 115 (Fig. 12) the angles of rotation of the shaft 79. Thus this indicating needle yields the heading of the aeroplane, as expressed by the angle $\alpha$.

The second sun-gear of the differential 84 also in mesh with the planetaries 73 is rigid with a gear 85. The gear 85 is in mesh with a gear 86 which meshes with a gear 87 fast on a shaft 88 which shaft mounts an indicating needle 89 arranged to cooperate with the same dial 115 (Fig. 12) as the needle 82 and which forms a control member. The needle 89 indicates the angle $\omega$ defined by the track with the north-to-south direction and is adjustable by means of the button 117. Both needles 82 and 89 remain at all times quite close to each other being separated only by the drift angle of the plane.

The drive ratio through the gear-train 85—86—87 is $+2$.

The spindle 90 of the sphere 32 which revolves in response to the wind velocity $v$ is rigid with the planetary-carrier 91 of a differential and carries planetaries 92. The planetaries 92 mesh with a sun-gear 93 rigid in rotation with a pinion 94 meshing with a gear 95 fast on a shaft 96 connected with the indicating and control member 69 (Fig. 11) for the introduction of the angle defining the direction of wind with respect to north. The ratio through the gearing 94—95 is $-2$.

The sun-gear 98 which meshes with the planetaries 92 is rigid with a gear 99 meshing with a gear 100 meshing in turn with the gear 87. The drive ratio through the gearing 99—100—87 is $+2$.

The above described computer arrangement is completed by a remote control system not shown and a repeater 101 arranged within sight of the pilot and adapted to repeat the indications of the deviation counter on the computer.

The repeater 101 comprises a dial opposite which are mounted a pair of needles 102—103 the arrangement being somewhat similar to that of the hands of a watch.

Similarly to the arrangement used in transmitting the required angular values to the supporting spindle of the sphere 16, there is used in this case a remote control system of known type but which does not comprise any relay. The spindle of the deviation counter 45 (Fig. 12) is rigid with the rotor of the transmitter of this remote control. The spindle 116 of the receiver rotor (Fig. 10) actuates the needle 103 rigidly secured thereon and is adapted in addition to control the needle 102 by means of a reducer-gearing.

The device described operates as follows:

When the navigator wishes to use the straight track which the aeroplane is to follow as one of the coordinate axes, he will introduce by means of the indicating control needle 89 the angle formed by said track with the selected north, this being accomplished through pivoting the needle 89 in front of its dial until it indicates the value of the angle $\omega$.

The needle 89 drives in rotation the shaft 88, the gear 87 and gear 85, which causes an angular rotation of the sun-gear 84 equal to $2\omega$. The planetaries 73 in revolving around the sun-gear 74 impart an angular rotation equal to $\omega$ to the cage 72. Similarly the meshing engagement of the gears 87—100—99 with the sun-gear 98 imparts an angular rotation equal to $\omega$ to the cage-member 91. It will readily be seen that the rotations imparted to the spindles 14 and 90 by means of the differentials 74—84 and 93—98 respectively result from the respective differences between the angles $\alpha$, $\omega$ and the angles $\beta$, $\omega$.

The counters of the computer will thus indicate the distance covered by the aircraft along the selected track while the deviation counter will at all times indicate the distance separating said aircraft from said selected track.

In order accurately to keep the selected course or track it will only be necessary for the pilot to keep an eye on the repeater and maintain the latter at zero, any off-track deviation being registered and remaining indicated on said repeater.

In short, the position as indicated by the device is referred to reference axes which are adapted to receive any selected orientation $\omega$ with respect to north, the angle $\omega$ being moreover registered upon a special dial or preferably upon the same dial 115 as the angle $\alpha$ (Fig. 12).

The navigational procedures resulting from the use of the above-described device may be summed up by describing some specific instances of use:

1. *It is desired to keep a rectilineal course A—B defined by its track angle $\omega$ (Fig. 13) with north.—*

Through setting an angle equal to ω upon the track angle dial the effect is that of selecting the track itself as one of the coordinate axes. After having marked this track upon the chart and graduated it in miles, readings are made of the distance AM on one of the counters and the deviation NM on the other counter, and both distances thus read define the coordinates relating to the actual position of the aeroplane which may thus be transferred to the chart.

Under such conditions it will only be necessary to fly the plane in such a way as at all times to keep the deviation counter and its repeater at zero, and the aeroplane will keep its course. This is facilitated by the fact that the repeater 101 at all times provides the pilot with a reading of the deviation both in direction and magnitude, while the navigator on his own part, through observing the counter of the position indicator can check the pilot's operations.

2. *A broken-line track is to be kept (Fig. 14).*—The track ABCD is drawn on the chart and graduated in miles for instance from the point A to the point D. At each apex of the broken line there may be inscribed the distance from the starting point A as measured along the track and near each segmental side the corresponding track-angle may be inscribed. Navigation along such a track may then proceed as follows:

On starting from the point A the indicating needle 89 is set upon the graduation ω=80° which relates to the track segment AB and upon the distance counter indicating the distance covered between A and B, the needle 89 will be set upon the graduation ω=25° relating to the track segment BC.

Similarly upon the counter indicating the combined value of the distances AB and BC the needle 89 will be set upon the graduation ω=330° relating to the track segment CD.

The apparatus may further include a signalling means adapted to indicate to the pilot the necessity of any change in course; as the aeroplane reaches any one of the points B, C, or D this is signalled by the distance counter.

3. *A change in course is to be effected (Fig. 15).*—The deviation counter being set at zero as well as its repeater at the time the plane has reached the point B, the navigator shifts the needle 89 from the reading ω=80° relating to the track segment AB to the reading ω=25° relating to the track segment BC, thereby setting the track segment BC as a new coordinate axis.

Since the plane will instantaneously veer off to the right from this new axis the deviation counter and its repeater will indicate increasing figures. Thus warned the pilot will at once start veering left, however the deviation will continue to increase up to a certain value M1, N1. As soon as the readings provided by the repeater start dropping off, the pilot can stop turning and resume piloting in a straight line, this enabling him gradually to get back to the track, which is reached as the deviation repeater will have returned to zero. It may occur for any reason that an unexpected change in the track is decided on during flight. In that case the procedure is the same, except that the navigator should first mark on the chart (Fig. 16) the point M2 at which the plane is positioned, draw the new track M2P, measure the track angle ω and register the latter on the track angle dial by means of the needle 89.

4. *Correcting the inscribed coordinates (Fig. 17).*—Whenever it is desired to make a direct check of one's position as through ground observation or any other means, the position is marked on the chart say at M′. Its coordinates AM′ and N′M′ are then measured and set on the counters instead of those previously registered thereon. This operation will immediately result in starting the manoeuver which will restore the plane to its track.

Exceptionally, if the aircraft has assumed a high off-track deviation it may be found preferable to give up the use of the reference system formed by the initial track, the checked point M′ being then taken as a new origin and the new track with the new distance axis being the straight line M′B. To that end it is simply necessary to set the new track angle ω₁, to re-set the deviation counter to zero and take the reading indicated at the time under consideration on the distance counter as an origin for the graduations of the new track.

The improved apparatus still permits however compass navigation. In order to resume compass navigation, the navigator will set the orientation of the reference axis at an invariable setting, and the pilot will not pay attention to the indications provided by the deviation repeater. The position is then transferred in planar coordinates whereof both the origin and the angular orientation may be arbitrarily selected. However, the instances where it may be useful to resort to this latter method are only quite exceptional (as in the case of close or disorderly flight).

If upon resuming compass navigation it were desired to obtain the position in latitude and longitude it will be necessary to provide the computer with means for introducing the latitude Y in the calculation of the longitude variation $$\frac{vt \sin \alpha}{\cos Y}$$

However if it is desired to navigate according to the track, it would be necessary to set latitude=zero so as to have cos Y=1 and use the longitude counter as a distance counter. In this way there would be obtained planar coordinates expressed in nautical miles.

It should be observed that in the case of compass-navigation the general arrangement shown in Fig. 9 is preserved. However, the gears 95 and 99 for wind direction and the gears 78 and 85 for the direction of the aeroplane will respectively be in direct meshing engagement, the differential being omitted as well as the gear 87, shaft 88 and gear 89. The drive ratio through the gearings 95—99 and 78—85 will then each be equal to 1.

The advantages of track navigation chiefly include the following for the navigator:

1. It is more natural, easier and quicker to inscribe the position by referring to the track which is pre-inscribed on the chart than by taking as a base the system of meridians and parallels.

2. In compass navigation if the pilot has made any error or been careless, there is nothing to show him that the aircraft has deviated off the track, while on the other hand in track navigation the off-track deviations remain registered upon the repeater until corrected.

3. In track navigation the pilot is merely compelled to always maintain at the same position the repeater needle in registry with a clearly visible index and this requires much less attention than maintaining a predetermined marking of the compass dial in registry with the lubber's line.

4. In compass navigation the drift has to be determined through mechanical or graphic means. Moreover since said drift is a function of the direction and the speed of the surrounding medium, the actual speed of the aircraft and the track angle, it must form the subject of a new determination each time one of those elements changes; in track navigation on the other hand this necessity does not arise because, through conforming to the indications of the deviation repeater, the pilot can immediately impart to the vehicle the necessary course to keep it on its track without it being necessary to compute the drift angle, the knowledge of which is not required.

What I claim is:

1. In a computer of the type described, a first group of members for determining the component velocities along two coordinate axes, comprising a first drive-sphere adapted for rotation on a diametric axis at a speed proportional to the instantaneous velocity V of said moving body and a first pair of rotary devices tangent to said first sphere adapted for rotation about mutually rectangular axes, said axes being parallel to the planes of tangency of said devices with said first sphere and contained in a common plane with the axis of rotation of said first sphere, one of said planes of tangency forming with the axis of rotation of said first sphere an angle $\alpha$ equal to the angle formed by the center axis of said body with a selected one of said coordinate axes, a second group of members for determining the component velocities along the same coordinate axes comprising a second drive sphere adapted for rotation about a diametric axis at a speed proportional to the reckoned wind velocity $v$ and a second pair of devices tangent to said second sphere adapted for rotation about mutually rectangular axes, said axes parallel to the planes of tangency of said second pair of devices with said second sphere and contained in a common plane with the axis of rotation of said second sphere, one of said tangent planes forming with the axis of rotation of said second sphere an angle $\beta$ equal to the angle formed by the direction of wind with said selected coordinate axis as selected for reference in the measurement of the angle $\alpha$, means for driving in rotation said drive spheres at respective speeds that are functions of V and $v$, means for modifying in each of said common planes the angular orientation of the axis of the related sphere, means for totalizing the movements of the rotary devices the planes of tangency of which form angles $\alpha$ and $\beta$ with the respective axes of rotation of said spheres on one hand and the movements of said other devices on the other hand, and casing means supporting said groups of members and means.

2. In a computer of the type described adapted for use in navigation with geographical coordinates, a first group of members for determining the component velocities along two coordinate axes comprising, a first pair of tangent spheres including a first drive-sphere adapted for rotation at a speed proportionate to the instantaneous velocity V of said body about a diametric axis forming with the center line of said first pair of spheres an angle equal to the angle $\alpha$ formed by the axis of said body with a south-to-north direction and a first driven sphere rotated from said first driven-sphere about a diametric axis contained in a common diametric plane of said first pair of spheres with the axis of rotation of said first drive sphere and forming with the center line of said first pair of spheres an angle equal to latitude plus 90°, and a first roller tangent to said first drive-sphere adapted for rotation on an axis parallel to said center line and contained in said common diametric plane of said first pair of spheres, a second group of members for determining the component velocities along the same coordinate axes comprising a second pair of tangent spheres which include a second drive sphere adapted for rotation at a speed proportional to the reckoned wind velocity $v$ on a diametric axis forming with the center line of said second pair of spheres an angle equal to the angle $\beta$ formed by the direction of wind with a south-to-north direction and a second driven sphere adapted to be driven in rotation on a diametric axis contained in the same common diametric plane of said second pair of spheres as the axis of rotation of said second drive sphere and forming with the center line of said second pair of spheres an angle equal to latitude plus 90°, and a second roller tangent to said second drive sphere and adapted for rotation about an axis parallel to the center line of said second pair of spheres and contained in the same common diametric plane of said second pair of spheres, means for driving both said drive-spheres at speeds that are respectively functions of V and $v$, means for altering in each of said common diametric planes the orientation of the axes of the corresponding spheres, means for totalizing the movements of both said driven spheres on one hand and the movements of both said rollers on the other hand and casing means for supporting said groups of members and means.

3. In a computer of the type described adapted for use in navigation with planar rectangular coordinates, a first group of members for determining the component velocities along two mutually rectangular coordinate axes comprising, a first drive-sphere adapted for rotation about a diametric axis at a speed proportional to the instantaneous velocity V of said moving body and a first pair of rollers tangent to said first sphere adapted for rotation about mutually rectangular axes said axes parallel to the planes of tangency of said rollers with said first sphere and contained in a common plane with the axis of rotation of said first sphere, one of said first pair of rollers forming with the diametric axes of said first sphere an angle $\alpha$ equal to the angle formed by the axis of said body with a selected one of the coordinate axes, a second group of members for determining the component velocities along the same coordinate axes and comprising a second drive sphere adapted for rotation about a diametric axis at a speed proportional to the reckoned wind velocity $v$ and a second pair of rollers tangent to said second sphere and adapted for rotation about mutually rectangular axes said axes parallel with the planes of tangency of said rollers with said second sphere and contained in a common plane with the axis of rotation of said second sphere, the axis of one of said rollers of said second pair forming with the axis of rotation of said second sphere an angle $\beta$ equal to the angle formed by the direction of wind with said selected coordinate axis as selected for $\alpha$, means for driving said drive spheres respectively at speeds that are functions of V and $v$, means for altering in each of said common planes the orientation of the corresponding sphere, means for totalizing the movements of said rollers forming angles α and β with the axis of rotation of said spheres on one hand and the movements of said other rollers on the other hand and casing means for supporting all said members and means.

4. A computer as in claim 1 wherein said drive-spheres and the drive-means therefor comprise for each sphere an orientatable support pivotally mounted on said casing, a rotary spindle perpendicular to the pivot axis of said support and supported substantially at its center from said support, two portions of a sphere of substantially equal extent together adapted substantially to form a complete sphere both secured on said rotary spindle, a first bevel-gear rigid with a first one of said sphere portions, a spindle coaxial with and extending through one end of said pivot of said support and driven in rotation as a function of a respective one of the magnitudes V and v, and a second bevel gear rotatable with said coaxial spindle and meshing with said first gear.

5. A computer as in claim 1 wherein said means for driving said second drive sphere comprise a member rotated at constant speed, means for multiplying said speed times a factor proportional to the velocity v and means operatively connecting said multiplying means with the axis of rotation of said sphere.

6. A computer as in claim 1 wherein said means for driving the pivotal spindle of said second drive sphere comprise a spindle rotated at constant speed and a speed variator interposed between said last mentioned spindle and said sphere pivotal spindle and comprising a fixed cam centered on said sphere pivotal spindle, a movable cam also centered on said sphere pivotal spindle, said cams being similar in contour and each comprising an arcuate section of larger radius extending substantially 180° and an arcuate section of smaller radius extending substantially 180°, means for modifying the position of said movable cam with respect to said fixed cam and means for driving in rotation said sphere spindle as a function of the angle of overlap of said smaller radius sections in said cams.

7. A computer as in claim 1 wherein said means for driving said second drive sphere comprise a spindle rotated at constant speed, a first gear fast on said spindle and a speed variator interposed between said constant speed spindle and the pivotal spindle of said sphere comprising a second gear loose on said pivotal spindle and meshing with said first gear, a pawl mounted on said second gear, a ratchet secured on said pivotal spindle in driven relationship from said pawl, a first and fixed cam centered on said pivotal spindle, a second and movable cam centered on said pivotal spindle and a third gear integral with said movable cam, both said cams similar in contour and each comprising an arcuate section of larger diameter extending substantially 180° and an arcuate section of smaller diameter extending substantially 180°, a pin projecting from the end of said pawl adapted to simultaneously exert pressure on the contours of both said cams, an orientation spindle parallel with said pivotal spindle, a fourth gear mounted at one end of said orientation spindle to mesh with said third gear, a wind velocity indicating dial and a button on said orientation spindle at the other end thereof adapted to be shifted by the navigator opposite said dial as a function of said velocity, whereby said pivotal spindle will be driven in rotation as a function of the overlap angle between said smaller radius cam sections in both said cams.

8. A computer as in claim 2 wherein said spheres, said rollers, said drive-sphere driving means and said means for totalizing the movements of said driven-sphere and said rollers comprise for each sphere, an orientatable support pivotally mounted on said casing, a rotary spindle extending at right angles to the pivotal axis of said support and supported substantially at its center from said support, a pair of sphere portions substantially equal in spherical extent and together forming substantially a complete sphere both secured on said rotary spindle, a first bevel-gear rigid with one of said sphere portions, a spindle coaxial with said pivot of said support extending through one end thereof and driven in rotation as a function of a respective one of the velocities V and v and a second bevel-gear fast on said coaxial spindle meshing with said first bevel-gear, both said coaxial spindles being adapted to be driven in rotation at speeds that are respectively functions of V and v for the drive spheres and respectively functions of $$\frac{V \sin \alpha}{\cos Y} \text{ and } \frac{v \sin \beta}{\cos Y}$$

for said driven spheres, and for each of said rollers, a frame mounted for oscillatory movement on said casing about an axis normal to the axis of rotation of said roller, a rotary spindle rigid with said roller and supported from said frame, a third bevel-gear rigid with said rotary spindle, a second spindle coaxial with the oscillatory pivot of said frame and extending therethrough and a fourth bevel-gear fast on said second coaxial spindle to mesh with said third bevel-gear, both said second coaxial spindles being respectively rotated at speeds that are functions of V cos α and v cos β, a pair of gears respectively fast on the output spindles of said driven spheres, a differential gearing including a sun-gear meshing with said gear rigid with said first driven sphere and another sun-gear meshingly engaged by said gear rigid with said second driven sphere, two gears fast on the output spindles of said rollers, and a second differential gearing including a sun-gear meshingly engaged by said gear fast with said first roller and a second gear engaged by said gear fast on said second roller.

9. A computer as in claim 3 wherein said spheres, said rollers, said sphere driving means and said means for totalizing the movements of said rollers comprise for each sphere an orientatable support pivotally mounted on said casing, a rotary spindle extending at right angles to the pivot of said support and supported substantially centrally thereof from said support, a pair of spherical portions of similar spherical extent adapted together to form a substantially complete sphere both fast on said rotary spindle, a first bevel-gear rigid with one of said sphere portions, a spindle coaxial with the pivot of said support and extending through one end thereof and driven in rotation as a function of a respective one of the magnitudes V and v, and a second bevel-gear fast on said coaxial spindle in meshing engagement with said first bevel-gear, both said coaxial spindles being adapted to be driven in rotation at respective speeds that are functions of V and v, and for each roller a frame pivotally mounted on said casing on a pivot at right angles to the axis of rotation of said roller, a rotary spindle rigid with said roller and supported from said frame, a third bevel-gear rigid with said rotary spindle, a second spindle coaxial with the pivot of said frame and extending therethrough and a fourth bevel-gear fast on said second coaxial spindle and meshing with said third bevel-gear, said spindles coaxial with said frame-pivots i. e. the roller output spindles being respectively rotated as functions of $V \sin \alpha$ and $v \sin \beta$ for said rollers forming angles $\alpha$ and $\beta$ with the axes of rotation of said spheres and as functions of $V \cos \alpha$ and $v \cos \beta$ for the remaining two rollers, four gears respectively fast on the output spindles of said rollers, a differential gearing comprising a sun-gear meshing with said gear fast on said output spindle rotated in response to $V \sin \alpha$ and another sun-gear engaged by said gear fast on said output spindle rotated in response to $v \sin \beta$ and a second differential gearing comprising a sun-gear engaged by said gear fast on said output spindle rotated in response to $V \cos \alpha$ and another sun-gear engaged by said gear fast on said output spindle rotated in response to $v \cos \beta$.

10. In a computer of the type described a first group of members for determining the component velocities along two coordinate axes, comprising, a first drive sphere adapted for rotation about a diametric axis at a speed proportional to the instantaneous velocity V of said body and a first pair of rotary devices tangent to said first sphere adapted for rotation about mutually rectangular axes, said axes being parallel to the planes of tangency of said devices with said first sphere and contained in a common plane with the axis of rotation of said first sphere, one of said planes of tangency forming with the axis of rotation of said first sphere an angle $\alpha$ equal to the angle formed by the axis of said body with a selected one of said coordinate axes, a second group of members for determining the component velocities along the same coordinate axes, comprising a second drive sphere adapted for rotation about a diametric axis at a speed proportional to the reckoned wind velocity $v$ and a second pair of devices tangent to said second sphere adapted for rotation about mutually rectangular axes, said axes parallel to the planes of tangency of the devices of said second pair with said second sphere and contained in a common plane with the axis of rotation of said second sphere, one of said tangent planes forming with the axis of rotation of said second sphere an angle $\beta$ equal to the angle formed by the direction of wind with the particular coordinate axis selected for the measurement of $\alpha$, means for driving said drive spheres in rotation at speeds that are respectively functions of V and $v$, means for altering in each of said common planes the orientation of the axis of said corresponding sphere, means for totalizing the movements of said devices whereof the planes of tangency form the angles $\alpha$ and $\beta$ with the axis of rotation of said sphere on one hand and the movements of said other two devices on the other hand, means for algebraically combining with the angles $\alpha$ and $\beta$ the angle $\omega$ formed by the track segment followed by said moving body with respect to said selected coordinate axis, a single member for controlling said algebraic combining means and a casing for supporting said members and means.

11. A computer as in claim 10 wherein said algebraic combining means comprise a differential gearing for each sphere including a first sun-gear centered on the pivotal spindle of support of said sphere and integral with a second gear, a planetary train rigid with said pivotal spindle and another sun-gear centered on said pivotal spindle and operatively connected with said means for altering the orientation of said sphere as a function of one of the angles $\alpha$ and $\beta$, gearing means to drive said second gears of both said first sun-gears in a common direction and means for driving said gearing means in response to the track angle $\omega$.

12. In a computer for determining in a given system of coordinates the coordinates of a position reached by a moving body starting from an initial position, said body having a device such as an anemometer for indicating the instantaneous air velocity thereof V, a device such as a compass for indicating the track angle thereof $\alpha$ with respect to a selected one of the reference axes and means for determining the wind velocity $v$ with respect to the ground and the wind direction $\beta$ with respect to the same reference axis, in combination, a first set of members connected with said instantaneous air velocity indicator and adapted for rotation at a speed proportional to V, a second set of members connected with said track angle indicator and adapted to pivot through an angle proportional to $\alpha$, a third set of members actuated by the pilot and adapted for rotation at a speed proportional to $v$, a fourth set of members operated by the pilot and adapted to pivot through an angle equal to $\beta$, means connected with said four sets of members for separately computing the components of the instantaneous velocity V of said body and the reckoned wind velocity $v$ with respect to said coordinate axes and means for adding the components of V and $v$ with respect to each of said axes.

EUGÈNE FRANÇOIS GILBERT GARNIER.

REFERENCES CITED

The following references are of record in the file of this patent:

UNITED STATES PATENTS

| Number | Name | Date |
| --- | --- | --- |
| 1,502,794 | Mouren | July 29, 1924 |
| 1,701,582 | Mengden | Feb. 12, 1929 |
| 1,743,239 | Ross | Jan. 14, 1930 |
| 2,066,949 | Ruiz | Jan. 5, 1937 |
| 2,109,283 | Boykow | Feb. 22, 1938 |
| 2,373,771 | Maxson | Apr. 17, 1945 |
| 2,444,933 | Jasperson | July 13, 1948 |